US006961792B1

(12) United States Patent
Le Graverand

(10) Patent No.: US 6,961,792 B1
(45) Date of Patent: Nov. 1, 2005

(54) SYSTEM FOR CONFIGURING EXPANDABLE BUSES IN A MULTI-DEVICE STORAGE CONTAINER AND RELATED METHOD

(75) Inventor: Philippe Le Graverand, Saint Lys (FR)

(73) Assignee: Storage Technology Corporation, Louisville, CO (US)

( * ) Notice: Subject to any disclaimer, the term of this patent is extended or adjusted under 35 U.S.C. 154(b) by 260 days.

(21) Appl. No.: 10/444,660

(22) Filed: May 23, 2003

(51) Int. Cl.$^7$ .................. G06F 13/00; G06F 13/14; H03K 17/00; H05K 7/02
(52) U.S. Cl. .................. 710/104; 710/51; 710/316; 709/253; 361/729
(58) Field of Search .................. 710/200, 300, 710/306, 315, 316, 51, 31, 104, 313; 709/220, 709/221, 227, 253; 714/3; 370/351, 502, 370/916; 711/5, 100; 712/33; 361/683, 685, 361/729

(56) References Cited

U.S. PATENT DOCUMENTS

| 3,053,945 A | * | 9/1962 | Harton et al. ............. 200/16 E |
| 3,215,784 A | * | 11/1965 | Williford .................... 379/232 |
| 3,611,317 A | * | 10/1971 | Bonfeld .................... 257/691 |
| 5,053,918 A | * | 10/1991 | Norden .................... 361/640 |
| 6,510,475 B1 | * | 1/2003 | Bennett .................... 710/60 |
| 6,754,751 B1 | * | 6/2004 | Willke .................... 710/112 |

OTHER PUBLICATIONS

"Improving the execution of groups of simulations on a cluster of workstations and its application to storage area networks" by Perles, A. et al. (abstract only) Publication Date: Apr. 22-26, 2001.*

* cited by examiner

Primary Examiner—Gopal C. Ray
(74) Attorney, Agent, or Firm—Brooks Kushman P.C.

(57) ABSTRACT

A system and method for configuring expandable buses wherein a host supports a plurality of expandable buses are provided. A plurality of devices are arranged to form a plurality of groups. Each group forms a chain of devices on an expandable bus. Each chain includes an input connector. The chains are configured such that connecting an expandable bus of the host to the input connector for a particular chain causes that particular chain to be directly connected to that particular expandable bus of the host. The absence of connecting any expandable bus of the host to the input connector for a particular chain causes that particular chain to be directly connected to a different chain so as to be indirectly connected to one of the expandable buses of the host.

10 Claims, 5 Drawing Sheets

UPON DETECTING THE CONNECTING OF A HOST BUS TO A CHAIN INPUT CONNECTOR, DIRECTLY CONNECTING THE CHAIN TO THE HOST BUS — 40

IN THE ABSENCE OF DETECTING THE CONNECTING OF A HOST BUS TO A CHAIN INPUT CONNECTOR, DIRECTLY CONNECTING THE CHAIN TO A DIFFERENT CHAIN — 42

SYSTEM FOR CONFIGURING EXPANDABLE BUSES IN A MULTI-DEVICE STORAGE CONTAINER AND RELATED METHOD

BACKGROUND OF THE INVENTION

1. Field of the Invention

The present invention relates to multi-device storage containers that have an internal expandable bus and to methods for configuring expandable buses.

2. Background Art

The use of expandable bus topologies has become widespread. For example, FireWire, USB and USB2 are well known expandable buses that are used today. In general, an expandable bus is any arrangement where a host supports a bus that may be expanded to allow the connection of multiple devices thereto. So, for example, SCSI and some other technologies such as arbitrated loop to a certain extent are also considered to be expandable buses. Typically, for any type of expandable bus there is a limit to the number of devices that may be placed on the same bus. For example, it is possible to put up to 63 devices on the same FireWire bus. Devices on the same bus share the same physical link such that the overall data throughput performance is limited by the bus type. In certain host implementations, the host may support more than a single bus.

When the host can support more than a single bus, it is useful to dispatch devices across all available buses. However, if the plurality of devices are encapsulated/gathered inside the same physical container, it could be difficult to arrange/modify the hardware bus topology among the plurality of devices in the container to adapt to the capabilities of the host. In the same way, the host could not adapt to a single container or set of containers. Further, the addition of a container to the host would desirably be hardware transparent to the greatest extent possible.

For the foregoing reasons, there is a need for an improved system for configuring expandable buses in a multi-device storage container and related method.

SUMMARY OF THE INVENTION

It is an object of the present invention to provide an improved system for configuring expandable buses in a multi-device storage container that configures the hardware bus topology among the plurality of devices in the container to adapt to the capabilities of the host, preferably, with minimal human intervention.

It is another object of the present invention to provide an improved system wherein multi-device storage containers are identical and interchangeable.

In carrying out the present invention, a system for configuring expandable buses wherein a host supports a plurality of expandable buses is provided. The system comprises a storage container containing a plurality of storage devices. The plurality of storage devices are arranged to form a plurality of groups. Each group forms a chain of storage devices on an expandable bus. The storage container further includes an input connector for each chain. The storage container and the chains are configured such that connecting an expandable bus of the host to the input connector for a particular chain causes that particular chain to be directly connected to that particular expandable bus of the host. Further, the storage container and the chains are configured such that the absence of connecting any expandable bus of the host to the input connector for a particular chain causes that particular chain to be directly connected to a different chain so as to be indirectly connected to one of the expandable buses of the host.

The storage container and storage devices may take a variety of forms such as a collection of drives in a drive enclosure with input connectors on the rear panel of the enclosure. There may be any number of predefined chains up to the number of storage devices present in the storage container. If no cable is connected to the associated input connector of any particular predefined chain, that chain is automatically linked to a different chain within the storage container. That is, if there is just one cable from the host (a single bus), all predefined device chains would be linked together and share the same bandwidth throughput. If there are multiple cable connections present from multiple buses of the host, the devices are dispatched accordingly onto the multiple buses. Preferably, the predefined chains are arranged as a sequence and any particular chain that does not have its own host connection is connected to the preceding chain.

At a more detailed level, the invention comprehends a plurality of configurable multiplexors and associated logic devices arranged such that for each chain a logic device causes that particular chain to be directly connected by a multiplexor to any expandable bus of the host presently connected to the associated input connector. Further, the logic device causes the particular chain to be directly connected to a different chain in the absence of any expandable bus presently connected to the associated input connector.

Further, in carrying out the present invention, a system for configuring expandable buses wherein a host supports a plurality of expandable buses is provided. The system comprises a plurality of devices arranged to form a plurality of groups. Each group forms a chain of devices on an expandable bus. Each chain includes an input connector. The chains are configured such that connecting an expandable bus of the host to the input connector for a particular chain causes that particular chain to be directly connected to that particular expandable bus of the host. The absence of connecting any expandable bus of the host to the input connector for a particular chain causes that particular chain to be directly connected to a different chain so as to be indirectly connected to one of the expandable buses of the host.

Still further, in carrying out the present invention, a method for configuring expandable buses wherein a host supports a plurality of expandable buses is provided. A plurality of devices are arranged to form a plurality of groups. Each group forms a chain of devices on an expandable bus. Each chain includes an input connector. The method comprises, upon detecting the connecting of an expandable bus of the host to the input connector for a particular chain, directly connecting that particular chain to that particular expandable bus of the host. The method further comprises, in the absence of detecting the connecting of any expandable bus of the host to the input connector for a particular chain, directly connecting that particular chain to a different chain so as to be indirectly connected to one of the expandable buses of the host.

The advantages associated with embodiments of the present invention are numerous. Preferred systems and methods provide an auto-adaptable and configuration-free hardware platform.

The above objects and other objects, features, and advantages of the present invention are readily apparent from the following detailed description of the preferred embodiment when taken in connection with the accompanying drawings.

DETAILED DESCRIPTION OF THE PREFERRED EMBODIMENT

Figure 1A:
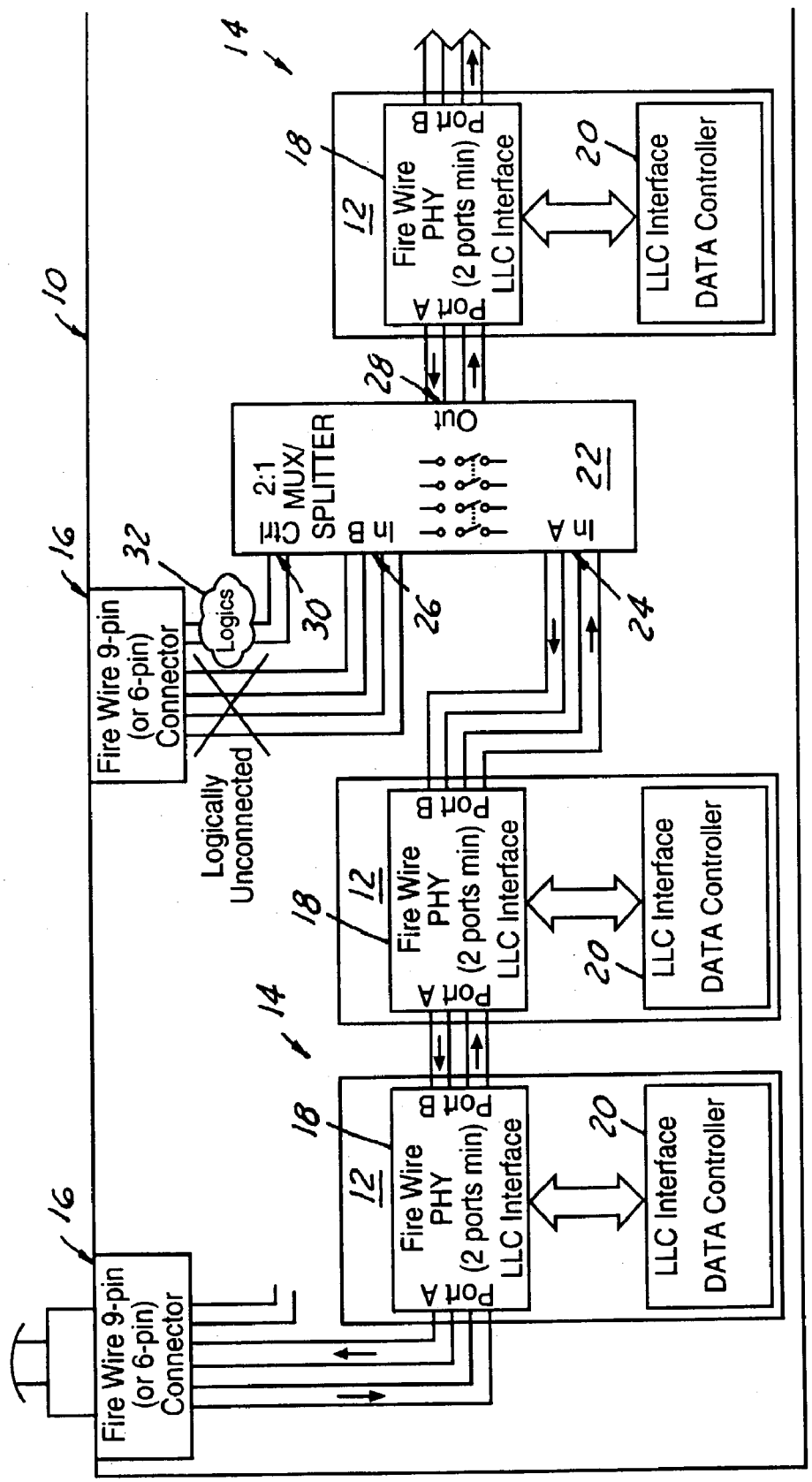
FIGS. 1A–1B is a diagram illustrating an exemplary embodiment of the present invention using FireWire where only the first FireWire cable is connected and all FireWire devices are on the same daisy chain.

FIGS. 1A–1B and 2A–2B illustrate an exemplary embodiment of the present invention that uses FireWire. Of course, embodiments of the invention may utilize any suitable expandable bus. A storage container 10 contains a plurality of storage devices 12. Of course, embodiments of the invention are not limited to storage devices or storage containers. Storage devices 12 are arranged to form a plurality of groups 14. Each group 14 forms a chain of storage devices 12 on an expandable bus of FireWire. Each chain has an associated input connector 16. As shown, the chains are arranged in a sequence with two FireWire devices per input connector 16. Of course, it is possible to put more or less FireWire devices on each input connector 16, and it is possible to put up to the standard FireWire limit of 63 devices on a potential chain.

Storage container 10 includes a plurality of configurable multiplexors 22 and associated logic devices 32. Each multiplexor 22 includes ports 24, 26, 28 and a selector 30. The multiplexors are 2:1 multiplexors such that it is possible to select which port, port 24 or port 26, is connected to port 28. Detection and self-configuration use the two power wires inside a FireWire carrying power cable. When a cable is connected onto a connector 16, logic 32 configures the 2:1 multiplexor 22 to switch the communication path to the input connector 16 (port 26). When a cable is not detected at input connector 16, logic 32 configures the 2:1 multiplexor 22 to switch the communication path to the previous controller (port 24).

Each device 12 includes a FireWire physical layer controller 18 having two ports (minimum) and a logical link control layer interface. Each device further includes a data controller 20 having a logical link control layer interface to communicate with the FireWire physical layer 18.

Figure 1B:
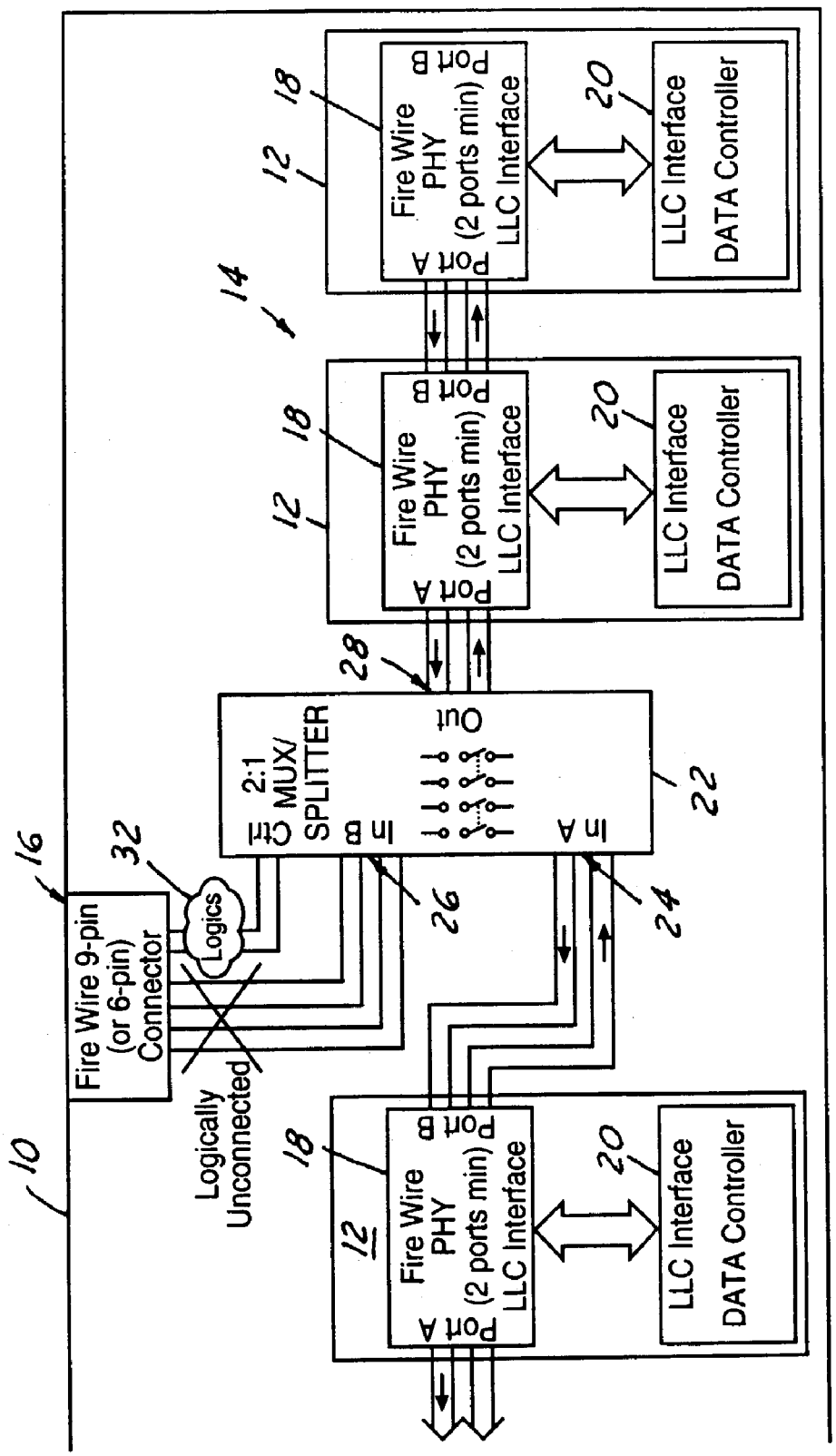
Figure 2A:
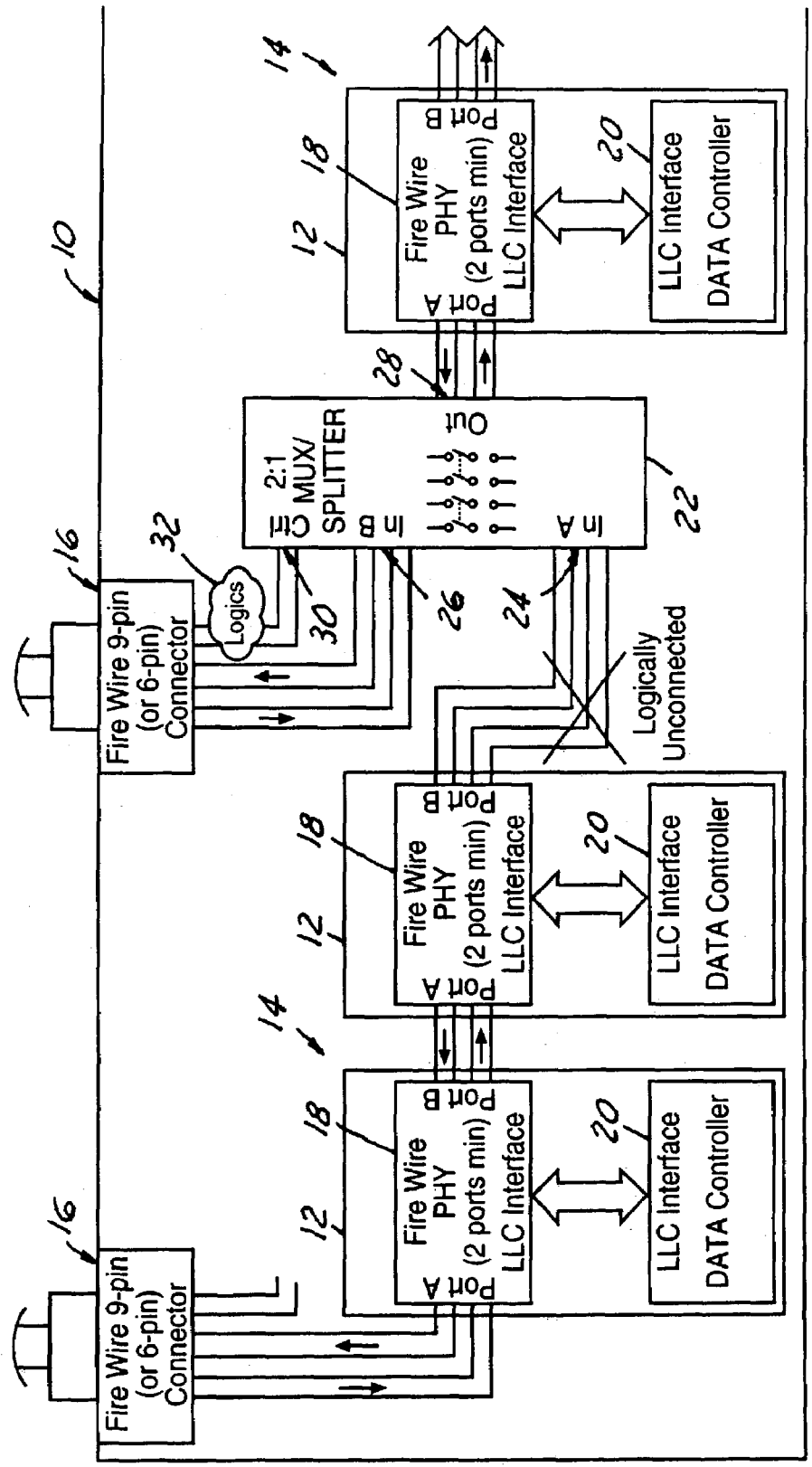
FIGS. 2A–2B is a diagram illustrating the exemplary embodiment with all the FireWire cables connected such that the FireWire devices are on several different daisy chains.
Figure 2B:
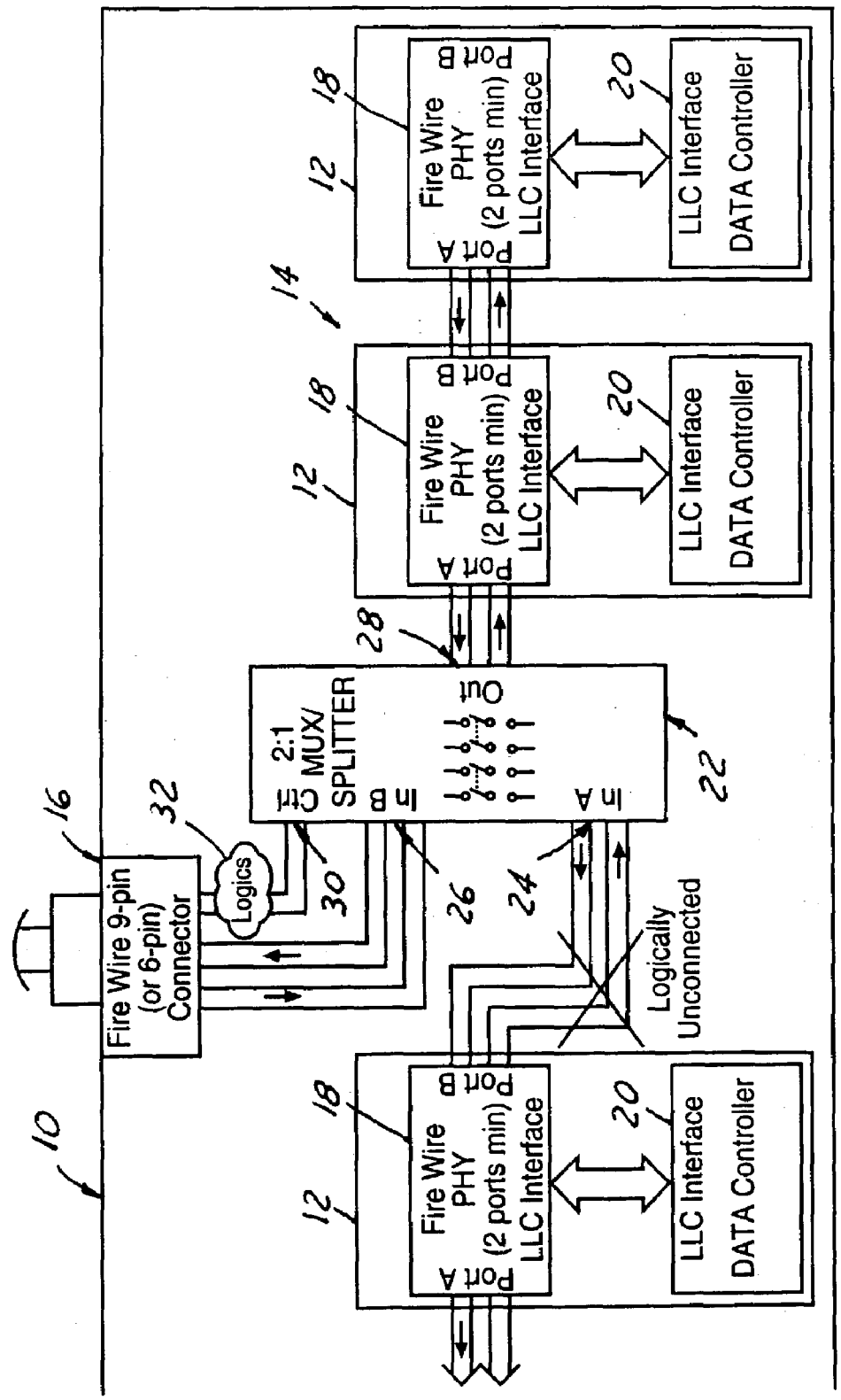

In FIGS. 1A–1B, only the first connector 16 receives a cable so all of the FireWire devices are on the same daisy chain. In FIGS. 2A–2B, all available connectors 16 receive a cable so the FireWire devices are dispatched on several independent daisy chains. Other potential cases are not shown in the drawings, but any configuration between these two cases is possible and supported in the example.

The FireWire implementation illustrated works for the several FireWire standard revisions provided that connectors and cables carrying power are used. In addition, although the FireWire devices are shown using a two-chip solution, a single chip solution having the FireWire physical layer interface embedded is possible. Lastly, although the use of FireWire has been discussed, any appropriate expandable bus may be used to implement embodiments of the present invention, as well as any types of devices.

Figure 3:
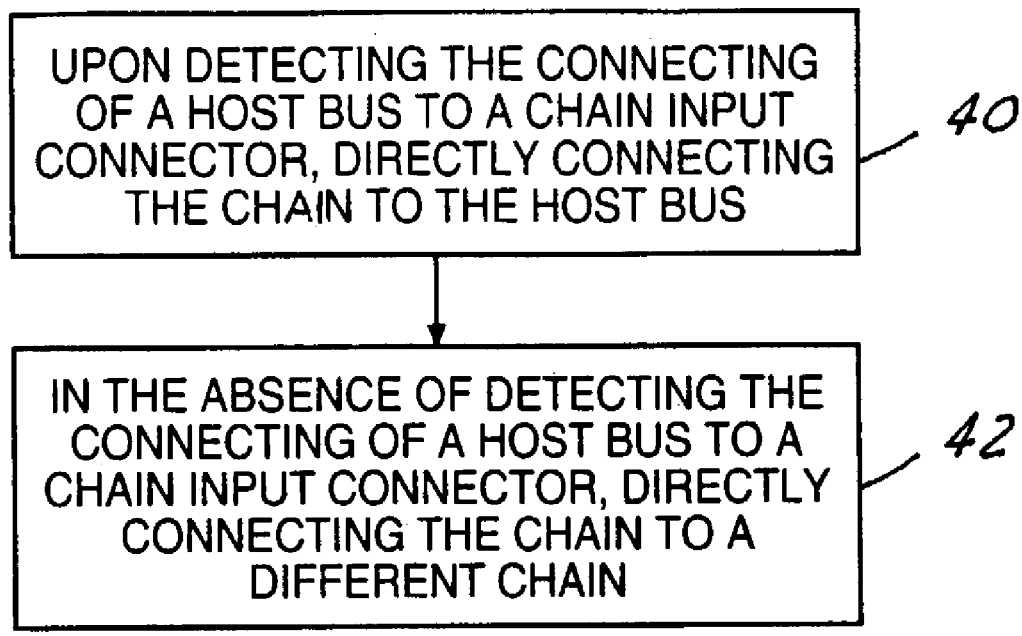
FIG. 3 is a method of the present invention.

FIG. 3 illustrates a method for configuring expandable buses. At block 40, upon detecting the connecting of an expandable bus of the host to the input connector for a particular chain, that particular chain is directly connected to that particular expandable bus of the host. At block 42, in the absence of detecting the connecting of any expandable bus of the host to the input connector for a particular chain, that particular chain is directly connected to a different chain so as to be indirectly connected to one of the expandable buses of the host. Preferably, the chains are arranged in a sequence such that when a particular chain is directly connected to a different chain, the different chain is the preceding chain in the sequence of chains.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for configuring expandable buses wherein a host supports a plurality of expandable buses, the system comprising:

a storage container containing a plurality of storage devices, the plurality of storage devices being arranged to form a plurality of groups, each group forming a chain of storage devices on an expandable bus, the storage container further including an input connector for each chain, the storage container and the chains being configured such that connecting an expandable bus of the host to the input connector for a particular chain causes that particular chain to be directly connected to that particular expandable bus of the host and such that the absence of connecting any expandable bus of the host to the input connector for a particular chain causes that particular chain to be directly connected to a different chain so as to be indirectly connected to one of the expandable buses of the host.

2. The system of claim 1 wherein the storage container and the chains are configured with the chains arranged in a sequence such that when a particular chain is caused to be directly connected to a different chain, the different chain is the preceding chain in the sequence of chains.

3. The system of claim 1 wherein the storage container includes a plurality of configurable multiplexors and associated logic devices arranged such that for each chain a logic device causes that particular chain to be directly connected by a multiplexor to any expandable bus of the host presently connected to the associated input connector, and causes that particular chain to be directly connected to a different chain in the absence of any expandable bus presently connected to the associated input connector.

4. The system of claim 3 wherein the storage container and the chains are configured with the chains arranged in a sequence such that when a particular chain is caused to be directly connected to a different chain, the different chain is the preceding chain in the sequence of chains.

5. A system for configuring expandable buses wherein a host supports a plurality of expandable buses, the system comprising:

a plurality of devices arranged to form a plurality of groups, each group forming a chain of devices on an expandable bus, each chain including an input connector, the chains being configured such that connecting an expandable bus of the host to the input connector for a particular chain causes that particular chain to be directly connected to that particular expandable bus of the host and such that the absence of connecting any expandable bus of the host to the input connector for a particular chain causes that particular chain to be directly connected to a different chain so as to be indirectly connected to one of the expandable buses of the host.

6. The system of claim 5 wherein the chains are arranged in a sequence such that when a particular chain is caused to be directly connected to a different chain, the different chain is the preceding chain in the sequence of chains.

7. The system of claim 5 further comprising:
a plurality of configurable multiplexors and associated logic devices arranged such that for each chain a logic device causes that particular chain to be directly connected by a multiplexor to any expandable bus of the host presently connected to the associated input connector, and causes that particular chain to be directly connected to a different chain in the absence of any expandable bus presently connected to the associated input connector.

8. The system of claim 7 wherein the chains are arranged in a sequence such that when a particular chain is caused to be directly connected to a different chain, the different chain is the preceding chain in the sequence of chains.

9. A method for configuring expandable buses wherein a host supports a plurality of expandable buses, and wherein a plurality of devices are arranged to form a plurality of groups, each group forming a chain of devices on an expandable bus, each chain including an input connector, the method comprising:
upon detecting the connecting of an expandable bus of the host to the input connector for a particular chain, directly connecting that particular chain to that particular expandable bus of the host, and in the absence of detecting the connecting of any expandable bus of the host to the input connector for a particular chain, directly connecting that particular chain to a different chain so as to be indirectly connected to one of the expandable buses of the host.

10. The method of claim 9 wherein the chains are arranged in a sequence such that when a particular chain is directly connected to a different chain, the different chain is the preceding chain in the sequence of chains.

* * * * *